(12) United States Patent
Watanabe et al.

(10) Patent No.: US 7,654,167 B2
(45) Date of Patent: Feb. 2, 2010

(54) ELECTRIC POWER STEERING APPARATUS EQUIPPED WITH WORM GEAR MECHANISM

(75) Inventors: Katsuji Watanabe, Wako (JP); Yasuo Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 293 days.

(21) Appl. No.: 11/727,933

(22) Filed: Mar. 29, 2007

(65) Prior Publication Data
US 2007/0227279 A1  Oct. 4, 2007

(30) Foreign Application Priority Data
Mar. 30, 2006 (JP) .............................. 2006-094147

(51) Int. Cl.
*F16H 55/22* (2006.01)
(52) U.S. Cl. ...................... 74/458; 74/388 PS; 74/409; 74/425
(58) Field of Classification Search .................. 74/425, 74/DIG. 10, 388 PS, 457, 458, 409, 440
See application file for complete search history.

(56) References Cited

U.S. PATENT DOCUMENTS

| | | | | |
|---|---|---|---|---|
| 1,727,046 | A | * | 9/1929 | Buch .......................... 74/440 |
| 3,535,948 | A | * | 10/1970 | Rychlik et al. ................ 74/440 |

FOREIGN PATENT DOCUMENTS

| | | |
|---|---|---|
| JP | 2004-330937 | 11/2004 |
| JP | 2005-16617 | 1/2005 |

* cited by examiner

*Primary Examiner*—Richard W L Ridley
*Assistant Examiner*—Terence Boes
(74) *Attorney, Agent, or Firm*—Arent Fox LLP

(57) ABSTRACT

An electric power steering apparatus includes a worm gear mechanism for transmitting the torque generated by an electric motor to a steered road wheel of the vehicle. The worm gear mechanism has a worm gear made of metal and a worm wheel formed of plastic material and meshing with the worm gear. The worm gear has a tooth profile including a dedendum part formed in an involute shape and an addendum part formed in a circular arc shape with a center located on a line of action.

2 Claims, 10 Drawing Sheets

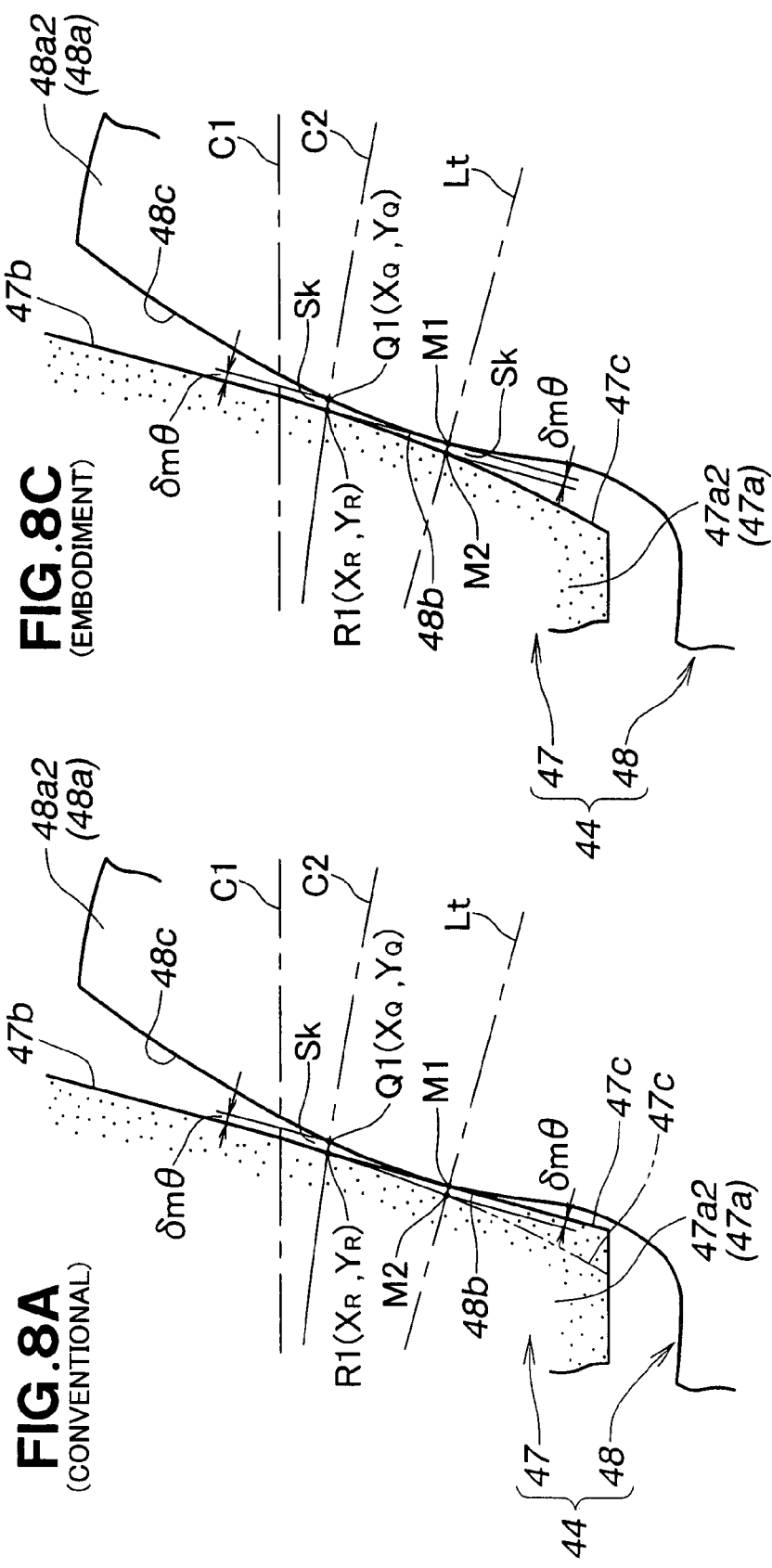
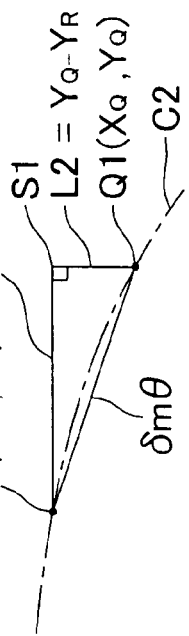

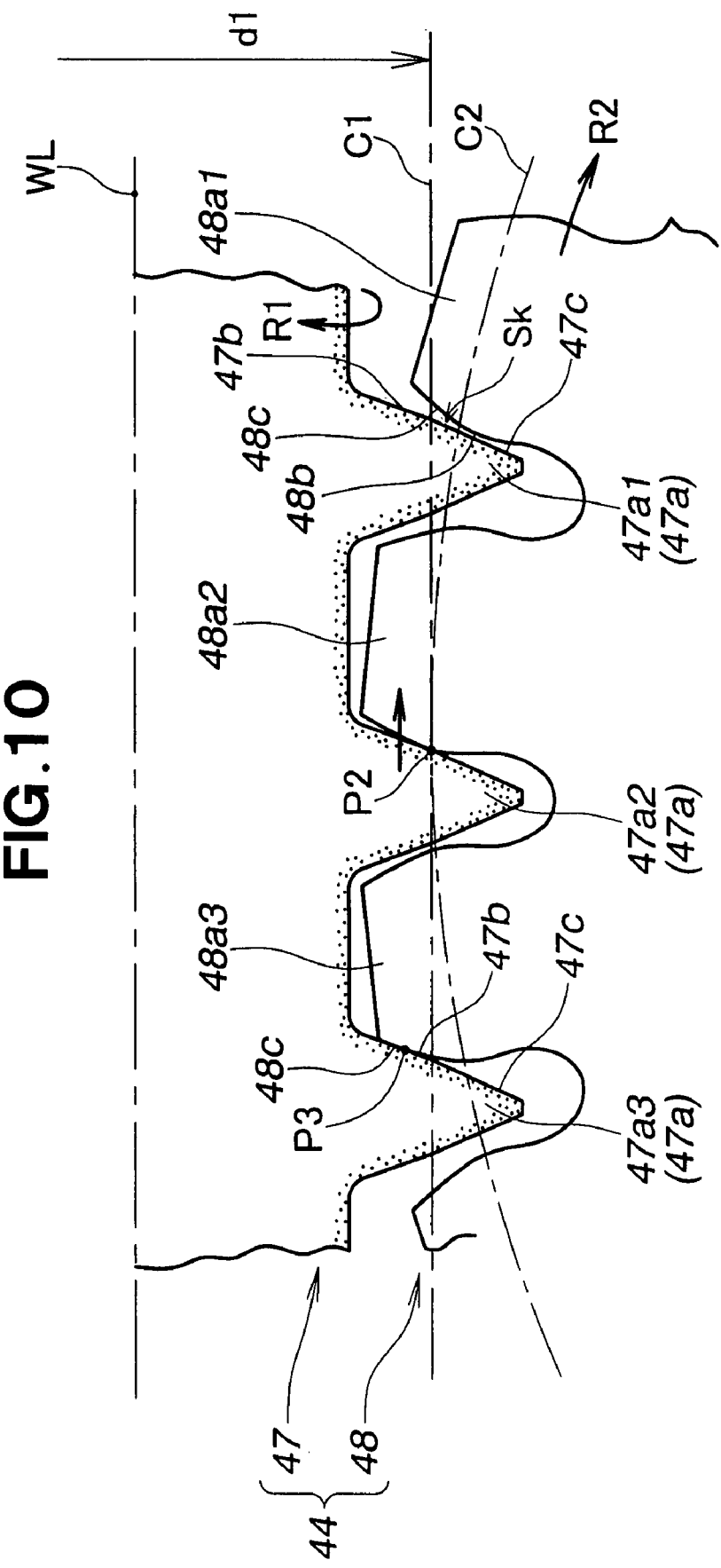

ELECTRIC POWER STEERING APPARATUS EQUIPPED WITH WORM GEAR MECHANISM

FIELD OF THE INVENTION

The present invention relates to an electric power steering apparatus for motor vehicle of the type wherein motor torque generated in accordance with steering input is boosted using a worm gear mechanism and transferred to steerable road wheels to thereby reduce the driver's muscular steering effort.

BACKGROUND OF THE INVENTION

Electric power steering apparatus of the type concerned are known and used heretofore. In one such known apparatus, which is disclosed in Japanese Patent Laid-open Publication (JP-A) No. 2005-16617, a proposal has been made to enhance the wear durability of a worm gear mechanism by improving the lubricating performance using a worm gear and a worm wheel gear having a tooth form or profile in a special form, which is different from an involute form and can retain most part of a lubricating agent (grease) on tooth surfaces within the tooth width of the worm wheel gear. Due to the specially shaped tooth form employed, the worm gear and worm wheel gear are relatively uneasy to manufacture and require a relatively high manufacturing cost.

In general, the worm gear and the worm wheel gear have two or three gear teeth working together on a working line. Not all the working points where the worm gear teeth and the worm wheel gear teeth are meshing together does lie on the pitch circle of the worm wheel gear. At one working point, the addendum of the worm gear tooth and the dedendum of the worm wheel gear tooth are working. In this instance, the working point is offset from the pitch circle toward the dedendum of the worm wheel gear and, hence, the load is concentrated at the dedendum of the worm wheel gear. This demands adequate consideration of the wear durability of the gear teeth.

Furthermore, as for the worm gear, since the working point is offset from the pitch circle toward its addendum side, the lead angle is smaller than that achieved in the case where the working point lies on the pitch circle. The small worm gear lead angle reduces the worm gear transfer efficiency and reversing efficiency, which gives a negative influence on the steering feel.

In the worm gear mechanisms, in order to ensure smooth meshing and low-noise operation, it may be considered that the worm gear is made of metal and the worm wheel gear is formed of a synthetic resin material. In this case, however, since the stiffness of the plastic worm wheel gear is relatively low, the worm wheel gear is likely to cause a creep strain due to heat generated during working together with the worm gear. Accordingly, a consideration should be made to the durability of the worm wheel gear.

SUMMARY OF THE INVENTION

It is accordingly an object of the present invention to provide an electric power steering apparatus having a worm gear mechanism, which is able to provide a favorable steering feeling, increase transfer efficiency (including reversing efficiency) at low loads, reduce the load on the worm wheel gear and hence improve the durability of the worm and worm wheel gear.

According to the present invention, there is provided an electric power steering apparatus for a vehicle comprising an electric motor for generating a torque in accordance with a steering input, and a worm gear mechanism for transmitting the torque generated by the electric motor to a steered road wheel of the vehicle. The worm gear mechanism has a worm gear made of metal and a worm wheel formed of plastic material and meshing with the worm gear. The worm gear mechanism further has a line of action along which contact between mating teeth of the worm gear and the worm wheel gear occurs. The worm gear has a tooth profile including a dedendum part formed in an involute shape and an addendum part formed in a circular arc shape with a center located on the line of action.

With the dedendum of the worm gear tooth being set as a reference, the profile of the worm gear tooth is modified in the negative direction, starting from the pitch circle toward the addendum. This method of modified profile is to move the contact point from the line of action to the pitch circle of the worm wheel gear. The amount of modification is equal to a clearance formed between the worm gear profile and the worm wheel gear profile on the pitch circle of the worm wheel gear at the contact point. And the direction is the negative direction at the contact point. Thus, this avoids the contact between the addendum of the worm gear and the dedendum of the worm wheel gear.

By not modifying the worm gear dedendum, it can work with the worm wheel gear addendum at low loads. Due to the contact at the dedendum of the worm gear tooth, the lead angle at the contact point is enlarged and transfer efficiency is increased. This tooth shape condition enables an increase in reversing efficiency in travel areas with low loads, such as when beginning the steering wheel turn and when turning the steering wheel back. Therefore, the friction torque of the steering wheel caused by the motor friction torque can be reduced and a favorable steering feeling can be provided to the electric power steering system.

On the other hand, as the working point is at the dedendum of the worm gear and the addendum of the worm wheel gear, the distance to the working point (contact point) is more extended for the worm wheel gear; therefore, loads can easily cause the worm wheel gear teeth to elastically deform. Even under these conditions of an increased load, the clearance between the worm gear modified in the negative direction and the worm wheel gear reduces, the teeth dedendum of the worm gear and the addendum of the worm wheel gear are predominant in the working between the teeth of the worm gear and the worm wheel gear. This avoids an increase in load on the worm gear and gouging of the worm gear addendum into the dedendum of the worm wheel gear. As a result, contact between the teeth becomes favorable and allowable torque can be increased.

In this manner, the new tooth profile of the worm gear increases transfer efficiency during low loads. With high loads, it reduces the load and provides a favorable tooth bearing.

Preferably, the circular arc shape of the addendum part of the tooth profile is such that the worm gear has an addendum width reducing gradually from a pitch circle of the worm gear toward a top of each worm gear tooth. The worm gear mechanism may further include an auxiliary worm wheel rotatable relative to the worm wheel gear about the same rotation axis as the worm wheel gear and urged into meshing engagement with the worm gear for eliminating undesired backlash between the worm gear and the worm wheel gear.

BRIEF DESCRIPTION OF THE DRAWINGS

One preferred structural embodiment of the present invention will be described in detail herein below, by way of example only, with the reference to the accompanying drawings, in which:

FIG. 8A is an enlarged view of a portion of FIG. 5;

FIG. 8B is an enlarged view of a portion of FIG. 8C, showing the manner in which the amount of modification of the worm gear tooth profile is obtained by calculation;

FIG. 8C is a partial view of FIG. 7;

FIG. 10 is a view similar to FIG. 5, but showing the manner in which the worm and the worm wheel are working together according to this invention.

DETAILED DESCRIPTION OF THE PREFERRED EMBODIMENT

Figure 1:
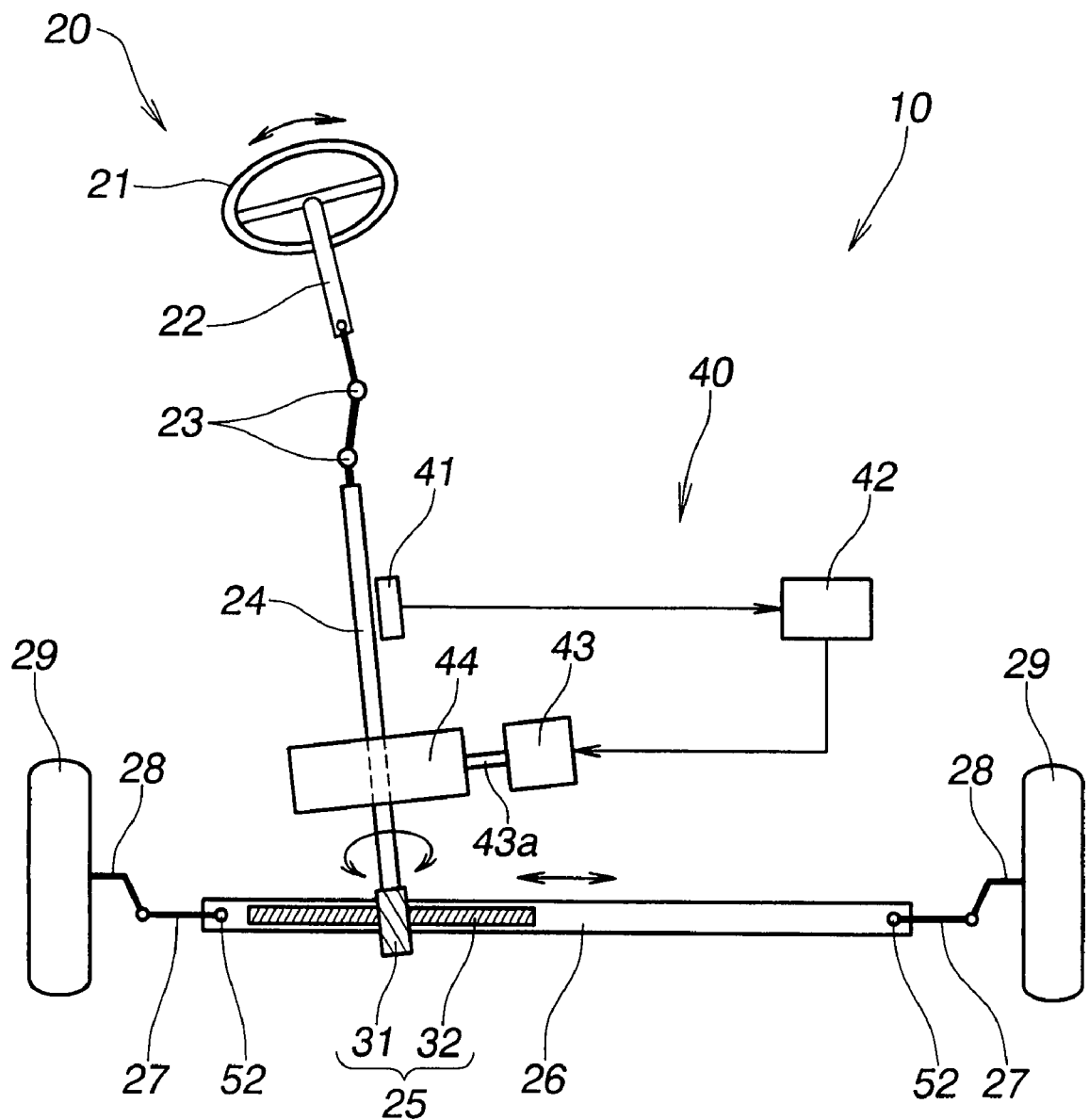
FIG. 1 is a diagrammatical view showing the general configuration of an electric power steering apparatus according to an embodiment of the present invention.

Referring now to the drawings and FIG. 1 is particular, there is shown an electric power steering apparatus equipped with a worm gear mechanism of the present invention.

The electric power steering apparatus 10 shown in FIG. 1 generally comprises a steering system 20 extending from a vehicle steering wheel 21 to steerable road wheels (in the illustrated embodiment, left and right front road wheels) 29 of the vehicle, and a steering torque assist mechanism 40 for supplying steering assist torque to the steering system 20.

In the steering system 20, a pinion shaft (input shaft) 24 is coupled to the steering wheel 21 via a steering shaft 22 and universal joints 23, and a rack shaft 26 is coupled to the pinion shaft 24 via a rack-and-pinion mechanism 25. Further, the left and right steerable road wheels 29 are coupled to opposite ends of the rack shaft 26 via left and right tie rods 27 and knuckle arms 28. The rack-and-pinion mechanism 25 includes a pinion 31 formed on the pinion shaft 24 and a rack 32 formed on the rack shaft 26.

With the steering system 20 thus arranged, when a human operator or driver of the vehicle operates the steering wheel 21, steering torque is delivered from the steering wheel 21 to the left and right steerable road wheels 29 via the rack-and-pinion mechanism 25, left and right tie rods 27 etc. and thereby steers the road wheels 29.

The steering torque assist mechanism 40 includes a steering torque sensor 41 for detecting steering torque applied by the driver to the steering system 20 through operation of the steering wheel 21, a control unit 42 for generating a control signal on the basis of the detected steering torque, an electric motor 43 for generating steering assist torque corresponding to the driver-applied steering torque on the basis of the control signal, and a worm gear mechanism 44 for transmitting the motor-generated steering assist torque from the motor 43 to the pinion shaft 24. The steering assist torque transmitted to the pinion shaft 24 is further transmitted to the rack-and-pinion mechanism 25. The worm gear mechanism 44 serves as a booster mechanism, which boosts the motor-generated steering assist torque.

With the steering torque assist mechanism 40 thus arranged, the left and right steerable road wheels 29 are steered by a combination of (i.e., composite torque composed of) the driver-applied steering torque and motor-generated steering assist torque via the rack shaft 26.

Figure 2:
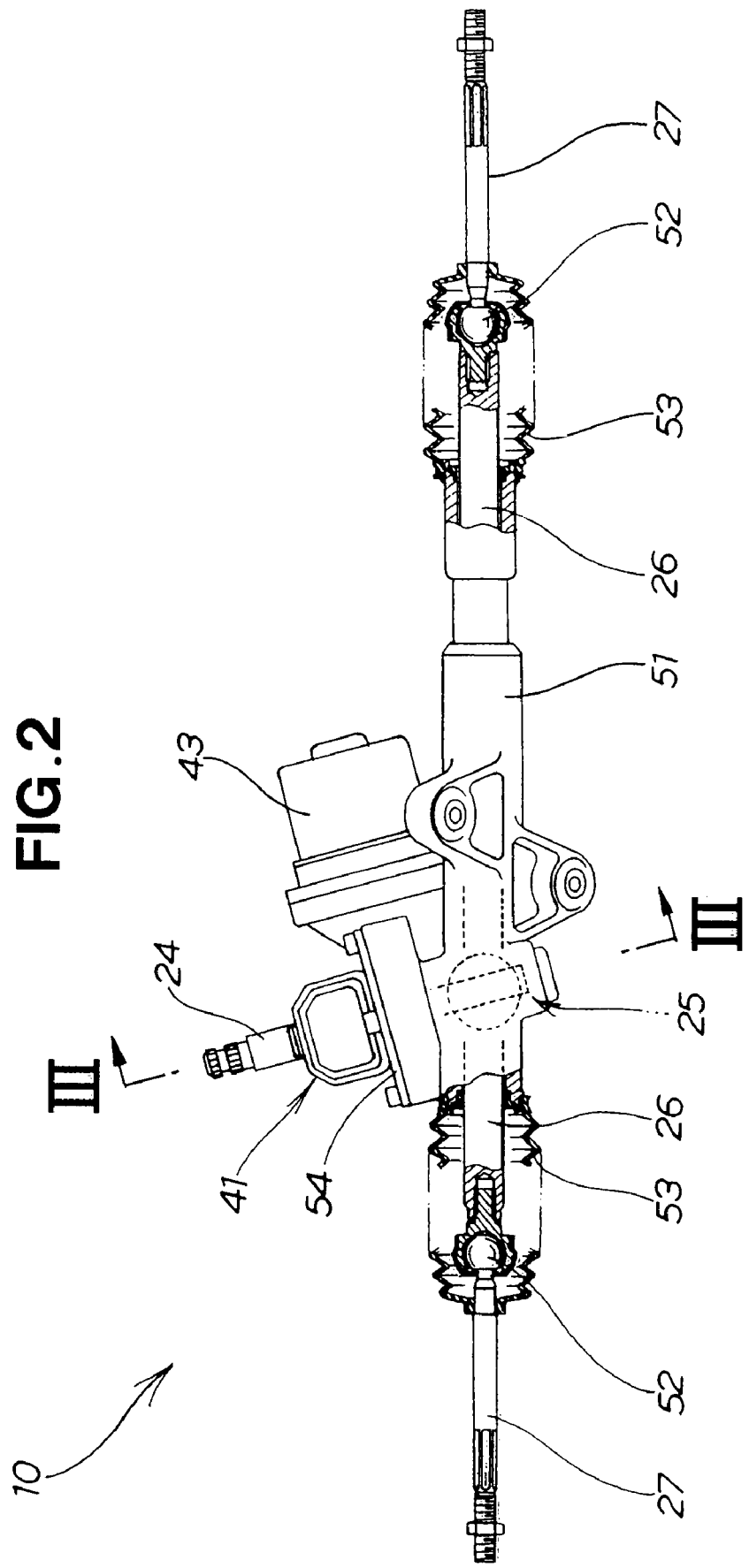
FIG. 2 is a schematic front elevational view, with parts cut away for clarity, of main portion of the electric power steering apparatus.

FIG. 2 shows the general configuration of the electric power steering apparatus 10 with parts cut away for clarity. As shown in FIG. 2, the rack shaft 26 is accommodated in a housing 51 extending in a widthwise direction of the vehicle (left-and-right direction in FIG. 2), and the rack shaft 26 is slidable axially within the housing 51. The tie rods 27, 27 are coupled, via ball joints 52, 52, to the opposite ends of the rack shaft 26 projecting outwardly from the housing 51. Reference numeral 53 represents a dust seal boot.

Figure 3:
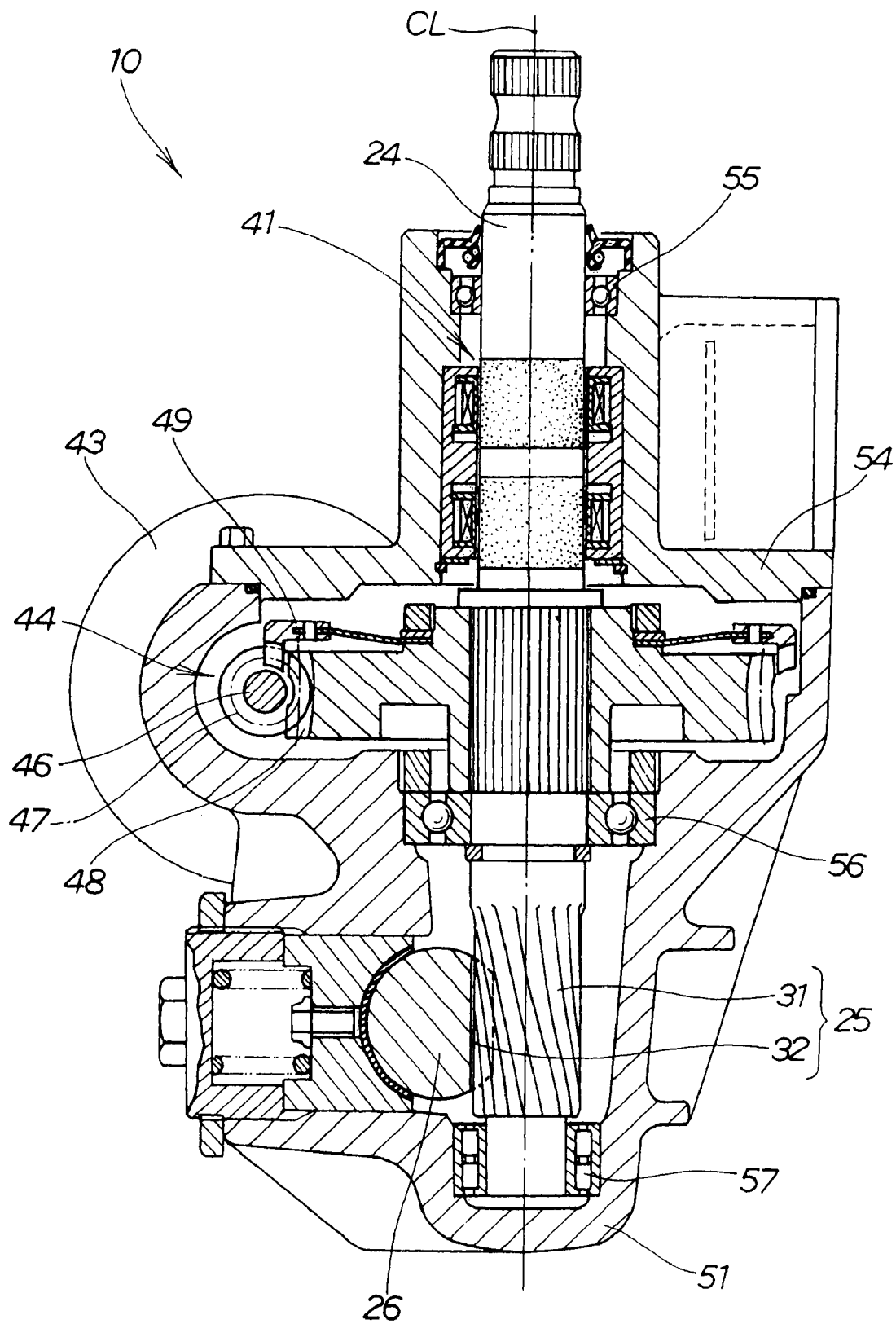
FIG. 3 is a cross-sectional view taken along line III-III of FIG. 2.

FIG. 3 is an enlarged sectional view taken along the line III-III of FIG. 2. As shown in FIG. 3, the pinion shaft 24, rack-and-pinion mechanism 25, steering torque sensor 41 and worm gear mechanism 44 are together accommodated in the housing 51. The housing 51 has an upper opening normally closed with an upper cover 54. The steering torque sensor 41 is attached to the upper cover 54 and comprises a magnetostriction torque sensor. The pinion shaft 24 extends vertically and is rotatably supported, at its upper end portion, longitudinally middle portion and lower end portion, by the housing 51 via three bearings 55, 56 and 57. The worm shaft 46 extends horizontally and is rotatably supported at opposite ends thereof by the housing 51 via bearings (not shown).

Figure 4:
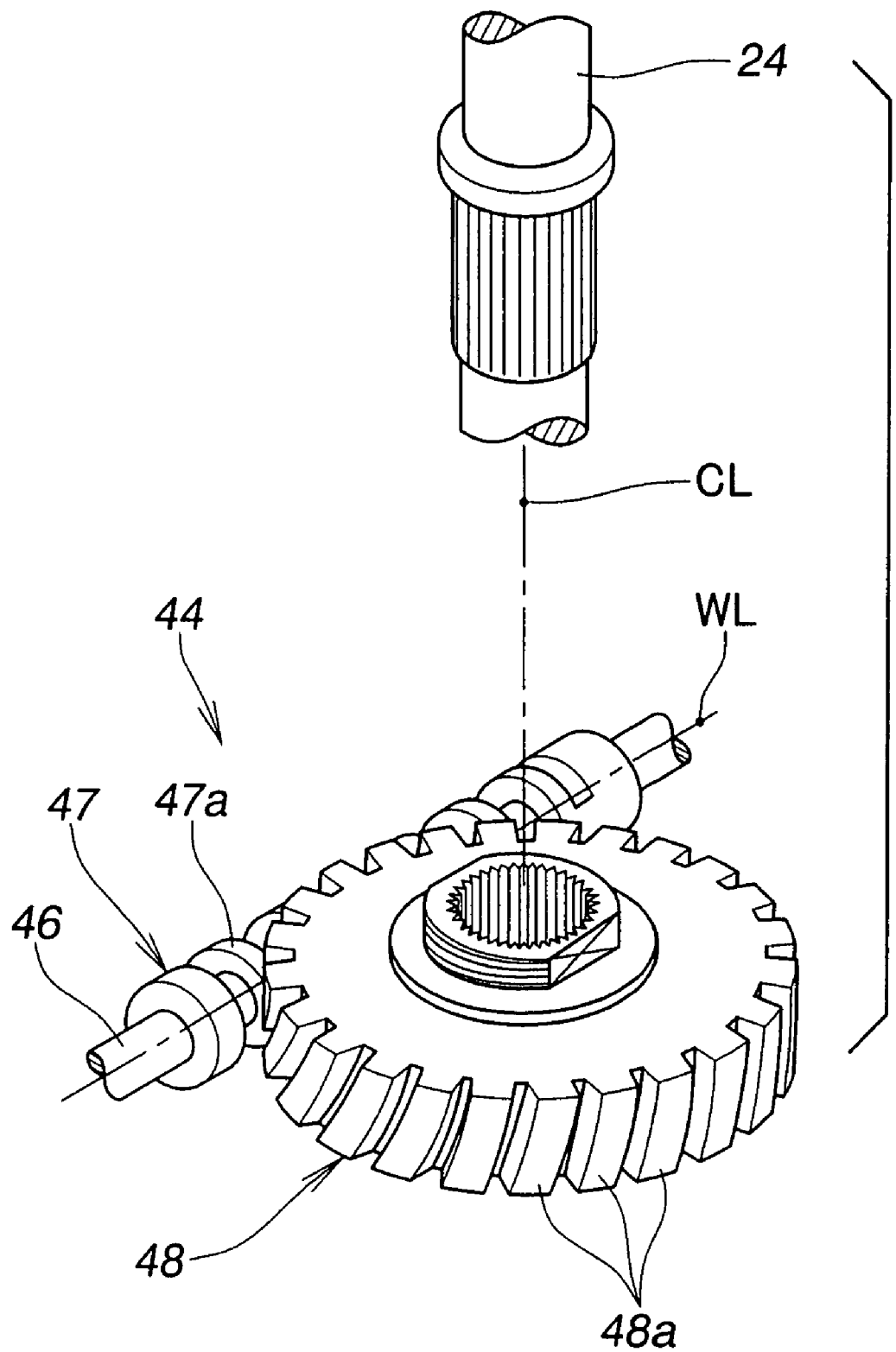
FIG. 4 is an exploded perspective view of a worm gear mechanism of the electric power steering apparatus.

The worm gear mechanism 44 includes a driving worm 47, a torque-transmitting worm wheel 48 meshing with the driving worm 47 so as to transmit torque from the worm 47 to a load side, and an auxiliary worm wheel 49 rotatable relative to the torque-transmitting worm wheel 48 about the same rotation center or axis CL as the worm wheel 48. The pinion shaft 24 is also rotatable about the rotation axis CL. The auxiliary worm wheel 49 also meshes with the worm 47. As shown in FIG. 4, the driving worm 47 is integrally formed on a worm shaft 46, which is coupled via a suitable coupling (not shown) to a motor shaft 43a (FIG. 1) of the motor 43. The torque-transmitting worm wheel 48 is coupled to the pinion shaft 24 for rotation with the pinion shaft 24.

With this arrangement, the motor-generated steering assist torque can be transmitted from the driving worm 47 through the torque-transmitting worm wheel 48 to the pinion shaft 24 on the load side. The auxiliary worm wheel 49 is provided with a view to eliminating undesired backlash between the driving worm 47 and the torque-transmitting worm wheel 48. To this end, the auxiliary worm 47 is urged into meshing engagement with the worm 47. The auxiliary worm wheel 49 may be omitted where appropriate.

The driving worm 47 is made of metal such as carbon steel for machine structural use (JIS-G-4051), and the torque-transmitting worm wheel 48 is made of plastic material such as nylon or polyamide. The steel worm 47 is highly rigid and unlikely to undergo elastic deformation, whereas the plastic worm wheel 48 is relatively low in rigidity and likely to undergo elastic deformation as compared to the steel worm 47. The steel worm 47 and the plastic worm wheel 48 thus used in combination are able to work together smoothly and silently.

Now, the driving worm 47 and torque-transmitting worm wheel 48 of the worm gear mechanism 44 will be detailed with reference to FIG. 5. The driving worm 47 and the torque-transmitting worm wheel 48 will be hereinafter referred to, for brevity, as "worm" and "worm wheel", respectively. For better understanding of the present invention, the worm 47 shown in FIG. 5 is illustrated as having a conventional involute profile.

Figure 5:
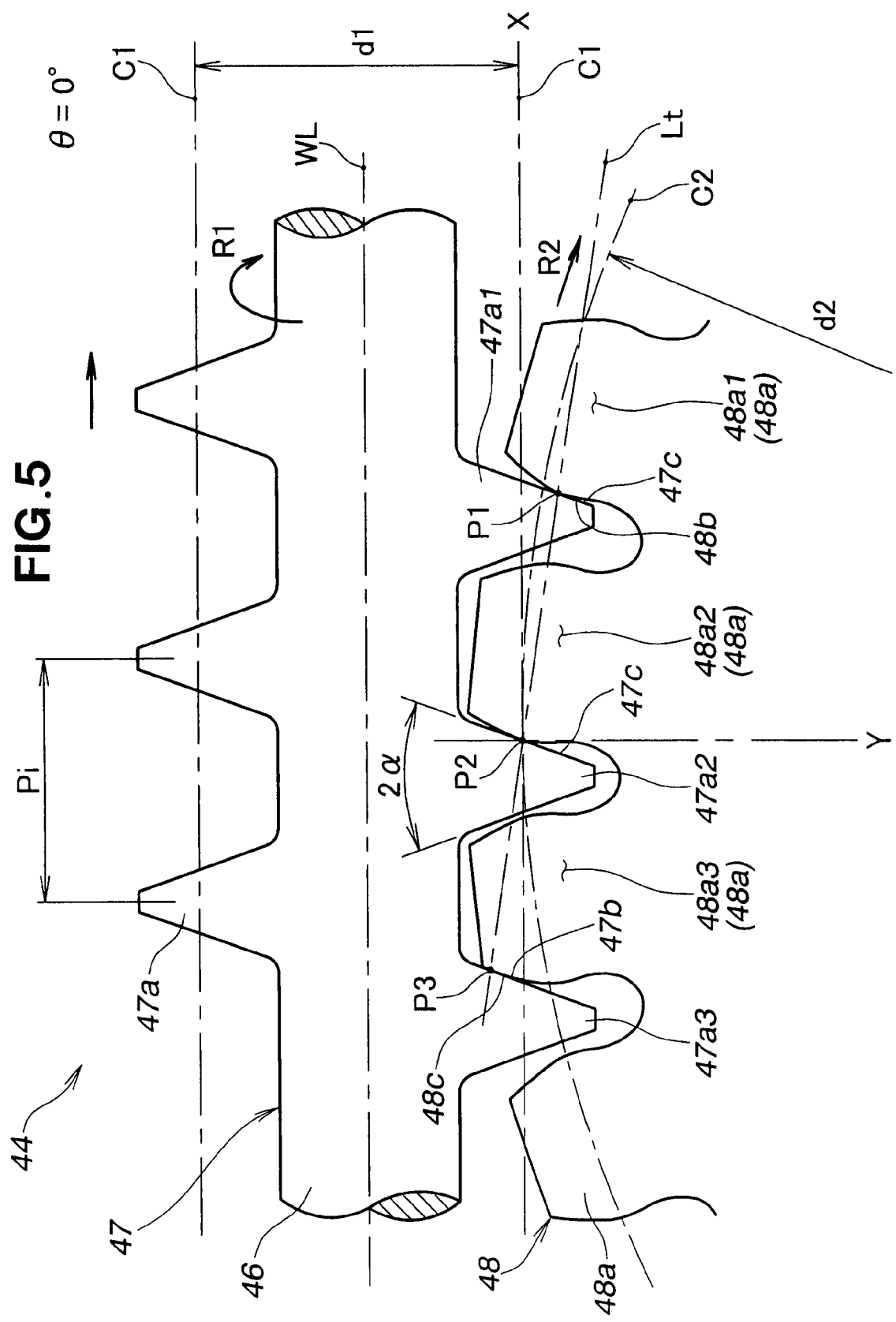
FIG. 5 is an enlarged fragmentary plan view of the worm gear mechanism illustrative of the manner in which a worm gear and a worm wheel gear are working together.

As shown in FIG. 5, the worm 47 has a pitch diameter d1 and the worm wheel 48 has a pitch diameter d2. The pitch diameter d1 is the diameter of a pitch circle C1, which is represented by two straight lines (standard pitch lines) C1 and C1 extending parallel to a longitudinal centerline WL of the worm 47. Similarly, the pitch diameter d2 is the diameter of a pitch circle C2, which is represented by a circle with a center located on the centerline CL (FIG. 3). The worm 47 is a single-threaded worm having only one thread 47a thereon. The thread 47a of the worm 47 has a pitch Pi. On the standard pitch lines C1, the worm thread 47a has a lead angle, which is slightly larger than a friction angle of the flank surface, so that turning the worm wheel 48 can rotate the worm 47. This means that the worm gear mechanism 44 has reversing characteristic, which can be improved by increasing the reversing efficiency. When the worm 47 rotates in the clockwise direction as indicated by the arrow R1, the worm wheel 48 is rotated in the clockwise direction as indicated by the arrow R2.

The thread 47a of the worm 47 has an involute profile and is trapezoidal shape in cross section, and the teeth 48a of the worm wheel 48 have an involute profile. The thread 47a of the worm 47 and the teeth 48a of the worm wheel 48 have a pressure angle α.

As shown in FIG. 5, the worm 47 and the worm wheel 48 are working such that meshing engagement occurs between three adjacent turns of the screw thread 47a of the worm 47 and three adjacent ones of the teeth 48a of the worm wheel 48. For the purpose of explanation, the three adjacent teeth 48a of the worm wheel 48, as looking in a direction from the right to left in FIG. 5, are called a first tooth 48a1, a second tooth 48a2 and a third tooth 48a3. Similarly, that part of the screw thread 47a which is in mesh with the first tooth 48a1 of the worm wheel 48 is called a first tooth 47a1, that part of the screw thread 47a which is in mesh with the second tooth 48a2 of the worm wheel 48 is called a second tooth 47a2, and that part of the screw thread 47 which is in mesh with the third tooth 48a3 of the worm wheel 48 is called as a third tooth 47a3.

The second tooth 47a2 of the worm 47 and the second tooth 48a2 of the worm wheel 48 are in mesh with each other at a point P2 (second contact point) where the standard pitch line C1 of the worm 47 and the standard pitch line C2 of the worm wheel 48 intersect. This meshing or working condition is referred to as "standard working condition". The rotating angle θ of the worm 47 with θ =0 is hereinafter referred to as "rotating angle of the worm 47 at the start of meshing (θ=0). In the standard working condition, point P1 (first contact point) where the addendum 47c of the first tooth 47a1 of the worm 47 and the dedendum 48b of the first tooth 48a1 of the worm wheel 48 are working, and point P3 (third contact point) where the dedendum 47b of the third tooth 47a3 of the worm 47 and the addendum 48c of the third tooth 48a3 of the worm wheel 48 are working. Contact between the mating teeth 47a, 48a of the worm 47 and worm wheel 48 occurs along a line of action Lt, which is the common tangent to the base circles of the two meshing involute teeth. The line of action is also called as line of contact.

There are three working points (contact points) P1, P2 and P3 given in FIG. 5 and when using the plastic worm wheel 48 with low rigidity, the load placed on the teeth is different based on the working point according to the following relationship.

P1>P2>P2

The load is concentrated at the dedendum surface 48b of the worm wheel 48 and the load on the first tooth 48a1 of the worm wheel 48 determines the strength of the worm wheel gear teeth 48a.

From an efficiency standpoint, the lead angle of the worm 47 has an important role. For instance, reversing efficiency is the efficiency when the worm wheel 48 causes the worm 47 to rotate. In the electric power steering system, when the steering wheel 21 (FIG. 1) is returned, the worm wheel 48 must cause the worm 47 to rotate; therefore, reversing efficiency is treated as an important performance evaluation. As the lead angle that the addendum 47a forms is smaller than the lead angle that the dedendum 47b forms, the contact conditions of the addendums, for example in FIG. 5, as compared to the second tooth 47a2 and the third tooth 47a3, the first tooth 47a1 has a lower reversing efficiency.

Figure 6:
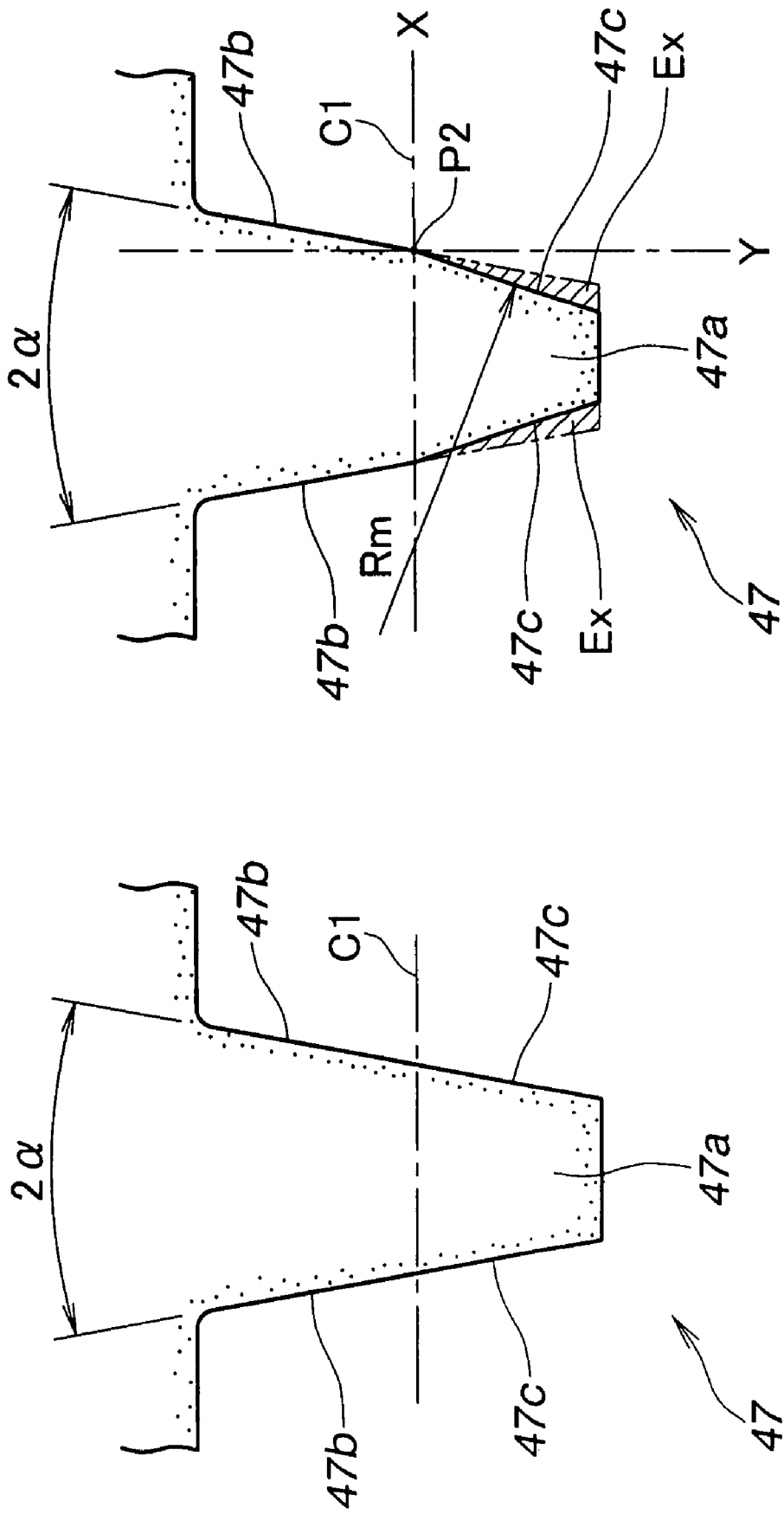
FIG. 6A is a diagrammatical view showing a conventional worm gear tooth shape.
FIG. 6B is a diagrammatical view showing a worm gear tooth with profile modification according to an embodiment of the present invention.

In view of the foregoing, an ideal gear profile would be one that equalizes the load on the working point, and, from an efficiency standpoint, one that would work near the dedendum surface 47b of the worm gear 47. However, this type of condition is difficult to obtain from small to large loads. As shown in FIGS. 6A and 6B, the invention proposed a tooth form shape where the worm teeth 47a work near the dedendum surface 47b when there are small loads, and with large loads, the worm wheel teeth 48a deflect through elastic deformation and the number of working points (contact points) increase.

FIG. 6A shows a conventional worm gear tooth shape having an involute profile, which is the same as that shown in FIG. 5. The worm gear tooth 47a has a generally trapezoidal shape in cross section having a dedendum 47b and an addendum 47c together forming a straight line. On the other hand, as shown in FIG. 6B, the worm gear tooth 47a of the present invention is modified in the negative direction, starting from the pitch circle C1 toward the addendum while the dedendum is set as a reference. The thickness of the tooth 47a decreases progressively from the pitch circle C1 toward the top of the tooth 47a, and the addendum 47c is of a circular arc shape having a radius Rm. In FIG. 6B, the amount of modification is indicated by hatching Ex.

Now, the worm gear tooth profile of this modification will be described by using the coordinate system of FIG. 7 which origin is the second working point P2 of FIG. 5. The worm gear teeth 47a are in the form of a single helical thread and, hence, the position of the teeth 47a does not actually change or shift in the axial direction of the worm 47 even when the worm 47 rotates. However, for easy understanding of the invention, description will be given on the assumption that as the worm 47 rotates in the direction of arrow R1 (FIG. 5), the position of the second worm gear tooth 47a2 moves along the X-axis in a direction toward the first worm gear tooth 47a1. By determining the rotating angle θ of the worm 47 with θ=0 at the starting point of the length of action, we derive coordinate M1 at a given worm rotating angle θ.

Figure 7:
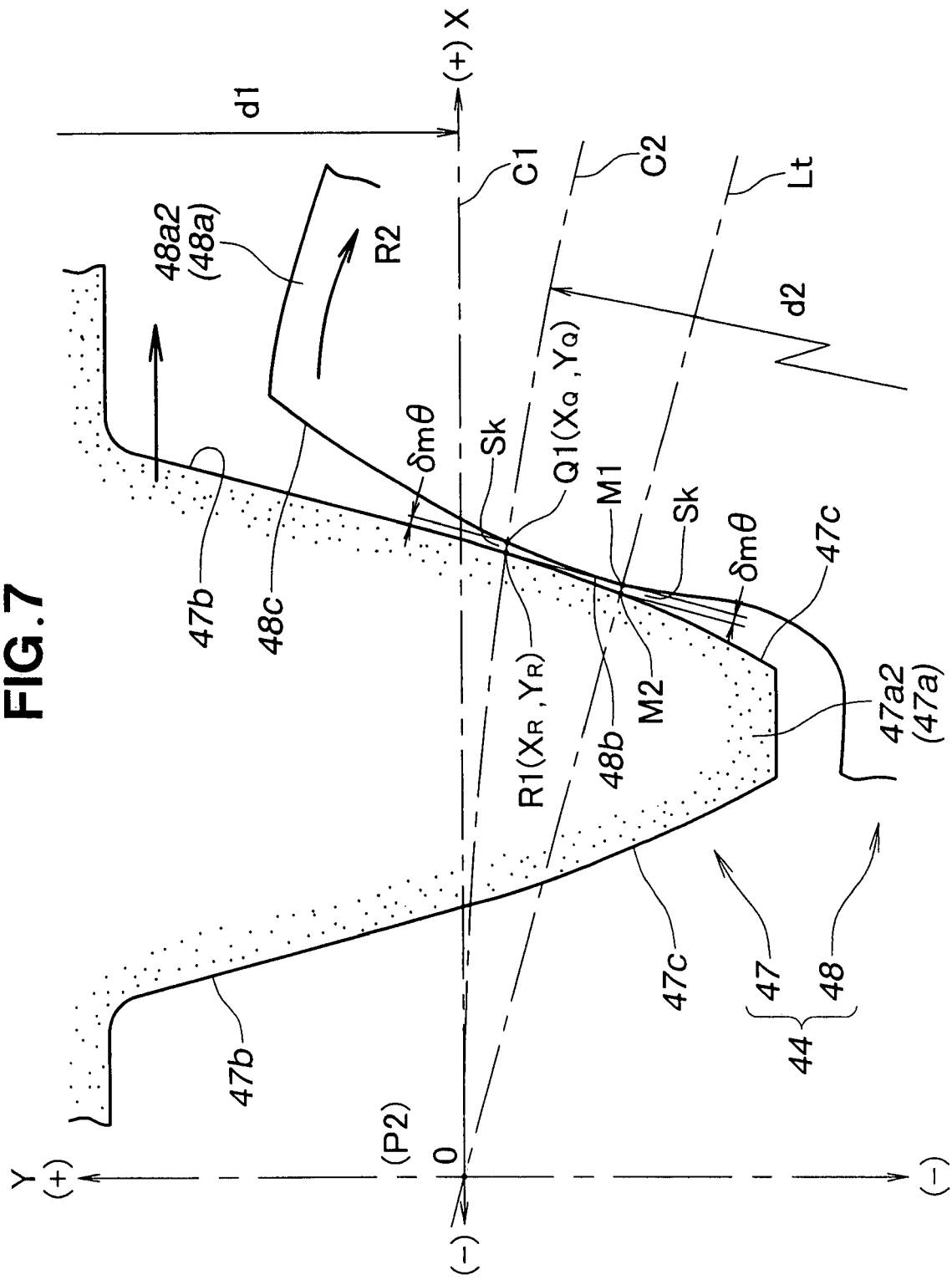
FIG. 7 is an enlarged view illustrative of the manner in which the worm gear and the worm wheel gear are working according to the present invention.

In the coordinate system shown in FIG. 7, point R1 is the intersection of the profile of the worm gear tooth 47a2 through point M2 and the pitch circle C2 of the worm wheel 48, and point Q1 is the intersection of involute curve of the profile of the worm wheel gear tooth 48a2 through point M1 and the pitch circle C2 of the worm wheel 48. As achieved in the case where both the worm 47 and the worm wheel 48 have involute tooth shape profiles, as shown in FIGS. 5 and 8A, point M1 is located on the line of action Lt where the worm gear tooth 47a and the worm wheel gear tooth 48a are working. Point R1 is represented by coordinate $(X_R, Y_R)$, and point Q1 is $(X_Q, Y_Q)$.

Given that the relationship between point R1 and point Q1 is represented by a right triangle ($\Delta R1S1Q1$), as shown on enlarged scale in FIG. 8B, the length of chord $\delta m \theta$ can be obtained by the following equation (1) according to Pythagorean theorem, where L1 is the length of side R1S1, L2 is the length of side S1Q1, $\angle S1$ is the right angle, and side R1S1 is parallel to the standard pitch line C1 of the worm 47.

$$\delta m\theta = \{(L1)^2 + (L2)^2\}^{1/2}$$
$$= \{(X_Q - X_R)^2 + (Y_Q - Y_R)^2\}^{1/2}$$
(1)

As is apparent from the equation (1), there is a clearance Sk (in the amount of $\delta m \theta$ between R1 and Q1 on the pitch circle C2 of the worm wheel 48, as shown in FIGS. 7 and 8C. According to a method of tooth profile modification of the present invention, the dedendum is set as a reference, and the worm gear tooth 47a is modified in the negative direction, starting from the pitch circle C1 toward the addendum in such a manner that the addendum 47c of the second worm gear tooth 47a2 intersects with the line of action Lt at point M2, which is spaced a distance $\delta m \theta$ from the working point M1 where the profile of the worm wheel gear tooth 48a2 intersects with the line of action Lt. By thus modifying the worm gear tooth profile, the addendum 47c of the worm gear tooth 47a has a circular arc shape and the thickness of the addendum 47c decreases progressively from the pitch circle C1 toward the top of the tooth 47a.

During working of the worm 47 and the worm wheel 48, it is necessary to keep the clearance Sk (in the amount of $\delta m \theta$) between the second worm gear tooth 47a2 and the second worm wheel gear tooth 48a2. In other words, the clearance Sk should be provided irrespective of a change in the rotating angle $\theta$ of the worm 47. The amount of a clearance Sk at a time when the rotating angle $\theta$ of the worm 47 changed from 0 to a given value can be obtained by the above-mentioned equation (1) according to the rotating angle $\theta$. Thus, the modified profile of the addendum 47c of the worm gear tooth 47a can be obtained by determining a locus of the addendum profile that varies with the rotating angle $\theta$ of the worm 47, as shown in FIG. 9.

Figure 9:
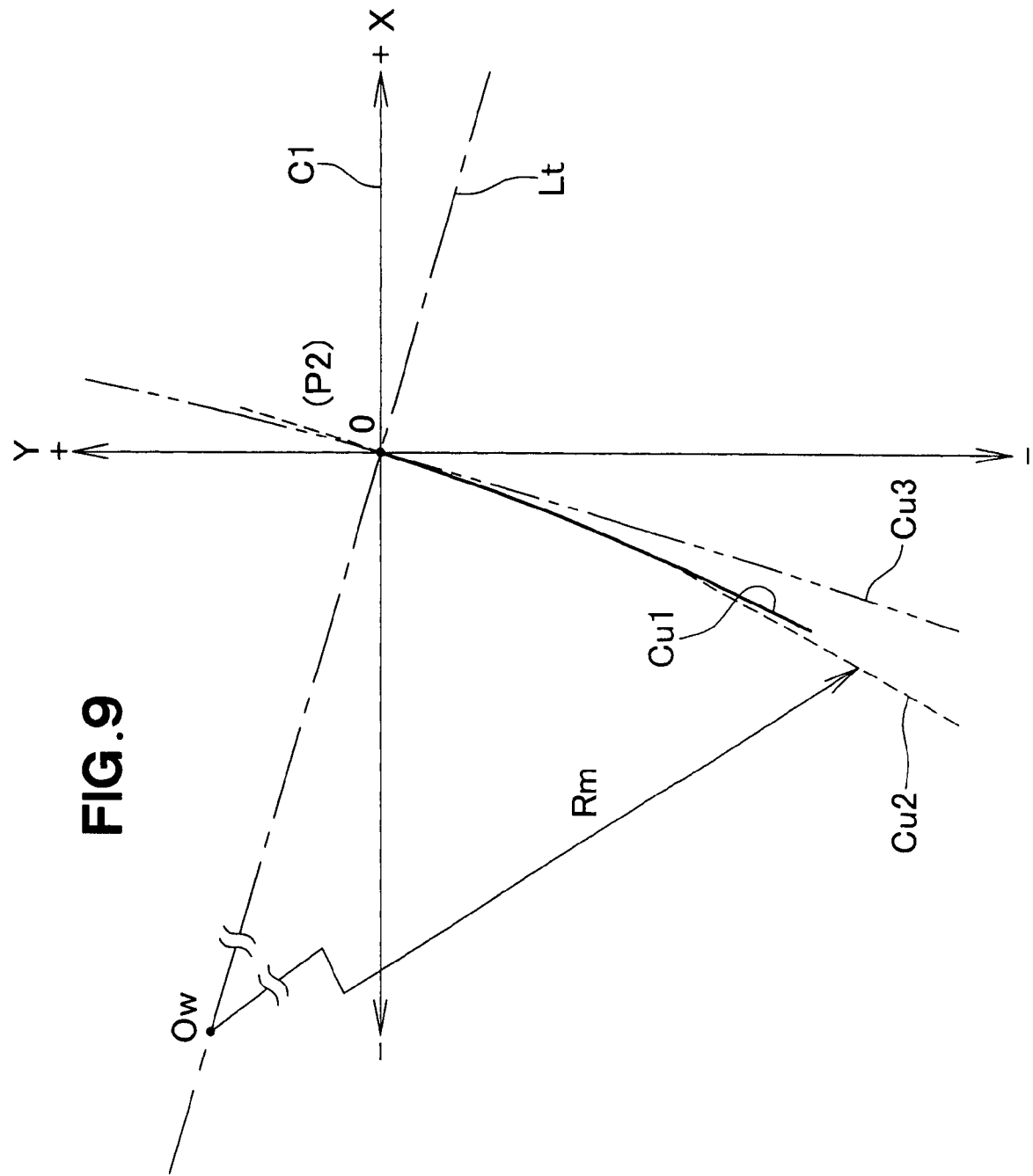
FIG. 9 is a view showing the locus of coordinate obtained by calculation to determine a modified profile of addendum of the worm gear tooth according to the present invention.

FIG. 9 shows a modified addendum profile of the worm gear tooth 47a of the present invention using the same coordinate system X-Y as FIG. 5 which origin is P2 (pitch point). In FIG. 9, the locus of point (X, Y) indicated by the solid line Cu1 represents the modified addendum profile of the worm gear tooth 47a that are obtained by theoretical calculation. The locus varies with the rotating angle $\theta$ of the worm 47, and when $\theta=0$, the locus meets at the origin P2. It would be ideal if the profile of the addendum 47c of the worm gear tooth 47a shown in FIG. 8C were coincident with the theoretically calculated addendum profile (locus) indicated by the solid-line Cu1 shown in FIG. 9. However, when this worm gear tooth profile is manufactured, the locus Cu1 is the approximated simple radius Rm with center Ow on the line of action Lt to ease tool shape. The thus approximated addendum profile is indicated by the dotted line Cu2 shown in FIG. 9. In FIG. 9, the phantom line Cu3 represents an involute line, which is used to form a profile of the conventional worm gear shown in FIG. 5 and FIG. 6A.

FIG. 10 is a diagrammatical view of a worm gear mechanism 44 according to the invention, illustrative of the manner in which a worm 47 and a worm wheel 48 are working together. In FIG. 10, the worm 47 and the worm wheel 48 are in the standard working condition and the rotating angle $\theta$ of the worm 47 is zero ($\theta=0$). The first worm gear tooth 47a1 and the first worm wheel gear tooth 48a1 are spaced from each other by a distance $\delta m \theta$ on the pitch circle C2 of the worm gear wheel 48. Thus, there is a clearance Sk defined between the first worm gear tooth 47a1 and the first worm wheel gear tooth 48a1. The second worm gear tooth 47a2 and the second worm wheel gear tooth 48a2 are in mesh with each other at a point P2 where the standard pitch line C1 of the worm 47 and the standard pitch line C2 of the worm wheel 48 intersect. At point P3, the dedendum 47b of the third tooth 47a3 of the worm 47 and the addendum 48c of the third tooth 48a3 of the worm wheel 48 are working. When the worm 47 starts rotating in the direction of arrow R1 under loads, the second and third worm gear teeth 47a2 and 47a3 are in sliding contact with and push the mating second and third worm wheel gear teeth 48a2 and 48a3, respectively, which cause the worm wheel 48 to rotate in the direction of arrow R2.

When the input torque (torque applied to the worm 47 or transfer torque) is small, the number of working location (contact point) is 1 and contact is made between the second worm gear tooth 47a2 and the second worm wheel gear tooth 48a2 at point P2. Next, the input torque is raised to a certain but still low value and while only one worm gear tooth (second worm gear tooth 47a2) is working, the contact area surface increases. If the input torque is further increased to a predetermined value, the working locations increase to 2 (second and third worm gear teeth 47a2 and 47a3) as at points P2 and P3 and the working surface area also further increases. Contact between the third worm gear tooth 47a3 and the third worm wheel gear tooth 48a3 occurs at the dedendum 47b of the worm gear tooth 47a3. Finally, when a large input torque is applied, the number of working locations increases to 3 (as at P2, P3 and a contact point between the first worm gear tooth 47a1 and the first worm wheel gear tooth 48a1) and the contact surface area also further increases. This confirms that the number of working teeth and the amount of contact surface area increase corresponding to load.

As shown in FIG. 10, by concentrating the load on the worm wheel gear addendum 48c, contact can be made near the dedendum 47b of the worm gear teeth 47a2, 47a3 at low torque. The conventional worm gear 47 without a modified tooth profile, such as shown in FIG. 5 and FIG. 8A, exert high addendum contact force and the transfer efficiency is determined by the lead angle formed by the working point near the addendum 47c. Through the negative modification of the addendum 47c giving a new tooth profile as discussed above, contact is primarily at the dedendum 47b of the worm gear teeth 47 at low loads. As the large lead angle formed by the dedendum 47b can actively be used, transfer efficiency is enhanced.

Thus, by not modifying the worm gear dedendum 47b, it can work with the worm wheel gear addendum 48c at low loads. Due to the contact at the dedendum 47b of the worm gear tooth 47a, the lead angle at the contact point P3 is enlarged and efficiency is increased. This tooth shape condition enables an increase in reversing efficiency in travel areas with low loads, such as when beginning the steering wheel turn and when turning the steering wheel 21 back. Therefore, the friction torque of the steering wheel 21 (FIG. 1) caused by the motor friction torque can be reduced and a favorable steering feeling can be provided to the electric power steering system.

On the other hand, as the working point is at the dedendum 47b of the worm gear 47 and the addendum 48c of the worm wheel gear 48, the distance to the working point (contact point) is more extended for the worm wheel gear 48; therefore, loads can easily cause the worm wheel gear teeth 48a to elastically deform. Even under these conditions of an increased load, the clearance Sk between the worm gear 47 modified in the negative direction and the worm wheel gear 48 reduces, the teeth dedendum 47b of the worm gear 47 and the addendum 48c of the worm wheel gear 48 are predominant in the working between the teeth of the worm gear 47 and the worm wheel gear 48. As shown in the conventional working of gear teeth of FIG. 8A, the load on the worm gear 47 is increased and addendum 47c gouges into the dedendum 48b of the worm wheel gear4 48 can be avoided. As a result, contact between the teeth becomes favorable and allowable torque can be increased.

In this manner, the new tooth profile of the worm gear 47 increases transfer efficiency during low loads. With high loads, it reduces the load and provides a favorable tooth bearing.

Even in a continuous running at high loads, the modified tooth profile of the worm gear 47 can provide a high transfer efficiency and a favorable tooth bearing to the electric power steering system, so that the worm gear 47 and the worm wheel gear 47 are able to work without generation of heat and hence the worm wheel gear 48 formed from plastic material is protected from creep (a time-dependent strain of the plastic worm wheel gear 48 caused by stress and enhanced under the effect of heat). Actual durability enhancement of the worm wheel 48 can thus be obtained.

Furthermore, since the addendum 47c of the worm gear 47 does never gouge into the dedendum 48b of the worm wheel gear4 48, the worm wheel gear 48 has a high wear resistance. This enables a reduction in module (the ratio of the pitch diameter in millimeters to the number of teeth) for both the worm gear 47 and the worm wheel gear 48, which will lead to a size reduction of the worm wheel gear 48 and added working smoothness with reduced operation noise and vibration.

Additionally, since the dedendum 47b of the worm gear teeth 47a has an involute profile and the addendum 47c of the worm gear teeth 47a has a circular arc profile, the dedendum profile and the addendum profile can smoothly meet with each other. This contributes to a reduction in friction resistance between the worm gear 47 and the worm wheel gear 48, leading to further smoothening of the working of the worm gear mechanism 44.

The electric motor 43 used in the electric power steering system should by no means be limited to the one that is configured to generate a steering assist torque in accordance with a detected output signal from a steering torque sensor 41 as in the illustrated embodiment, but may be so configured as to generates a torque and transmits the torque via the worm gear mechanism 44 to the vehicle steering system. Furthermore, the dedendum 47b of the worm gear teeth 47a Obviously, various minor changes and modifications of the present invention are possible in light of the above teaching. It is therefore to be understood that within the scope of the appended claims the invention may be practiced otherwise than as specifically described.

What is claimed is:

1. An electric power steering apparatus for a vehicle, comprising:
    an electric motor for generating a torque in accordance with a steering input; and
    a worm gear mechanism for transmitting the torque generated by the electric motor to a steered road wheel of the vehicle,
    wherein the worm gear mechanism has a worm gear made of metal and a worm wheel formed of plastic material and meshing with the worm gear, the worm gear mechanism further having a line of action along which contact between a plurality of adiacent teeth of the worm gear and a corresponding number of adiacent teeth of the worm wheel gear occurs when the worm gear and the worm wheel are meshing together,
    wherein the teeth of the worm wheel have an involute profile,
    wherein the worm gear has a tooth profile including a dedendum part formed in an involute shape and an addendum part formed in a circular arc shape, the circular arc shape of the addendum part having a center located on the straight line of action,
    wherein the worm gear has a dedendum width decreasing progressively at a first decreasing rate in a direction from a bottom of each tooth of the worm gear toward a pitch circle of the worm gear, and
    wherein the circular arc shape of the addendum part of the tooth profile is such that the worm gear has an addendum width decreasing progressively in a direction from the pitch circle of the worm gear toward a top of each worm gear tooth at a second decreasing rate greater than the first decreasing rate of the dedendum width of the worm gear.

2. The electric power steering apparatus as recited in claim 1, wherein the worm gear mechanism further includes an auxiliary worm wheel rotatable relative to the worm wheel about the same rotation axis as the worm wheel and urged into meshing engagement with the worm gear for eliminating undesired backlash between the worm gear and the worm wheel.

* * * * *